United States Patent
Dundas et al.

(10) Patent No.: US 12,159,141 B2
(45) Date of Patent: Dec. 3, 2024

(54) SELECTIVE CONTROL FLOW PREDICTOR INSERTION

(71) Applicant: Arm Limited, Cambridge (GB)

(72) Inventors: James David Dundas, Austin, TX (US); Yasuo Ishii, Austin, TX (US); Michael Brian Schinzler, Round Rock, TX (US)

(73) Assignee: Arm Limited, Cambridge (GB)

(*) Notice: Subject to any disclaimer, the term of this patent is extended or adjusted under 35 U.S.C. 154(b) by 7 days.

(21) Appl. No.: 17/949,874

(22) Filed: Sep. 21, 2022

(65) Prior Publication Data
US 2024/0095034 A1 Mar. 21, 2024

(51) Int. Cl.
*G06F 9/38* (2018.01)

(52) U.S. Cl.
CPC .......... *G06F 9/3838* (2013.01); *G06F 9/3861* (2013.01)

(58) Field of Classification Search
CPC .............................. G06F 9/3838; G06F 9/3861
See application file for complete search history.

(56) References Cited

U.S. PATENT DOCUMENTS

| | | | |
|---|---|---|---|
| 2003/0041230 A1* | 2/2003 | Rappoport | G06F 9/322 712/238 |
| 2003/0163678 A1* | 8/2003 | Brockmann | G06F 9/3806 712/E9.057 |
| 2005/0216713 A1* | 9/2005 | Prasky | G06F 9/30181 712/E9.035 |
| 2008/0040590 A1 | 2/2008 | Lee et al. | |
| 2013/0339693 A1 | 12/2013 | Bonanno et al. | |
| 2015/0268961 A1 | 9/2015 | Zuraski et al. | |
| 2018/0285114 A1* | 10/2018 | Shah | G06F 12/0864 |
| 2020/0004543 A1* | 1/2020 | Kumar | G06F 9/3844 |
| 2020/0285477 A1 | 9/2020 | Winrow et al. | |
| 2021/0373889 A1* | 12/2021 | Cai | G06F 9/3802 |
| 2022/0100666 A1 | 3/2022 | Ishii et al. | |

OTHER PUBLICATIONS

A. Jain and C. Lin, "Back to the Future: Leveraging Belady's Algorithm for Improved Cache Replacement," 2016 ACM/IEEE 43rd Annual International Symposium on Computer Architecture (ISCA), Seoul, Korea (South), 2016. (Year: 2016).*
Combined Search and Examination Report for GB Application No. 2312758.2 dated Feb. 9, 2024, 7 pages.

* cited by examiner

*Primary Examiner* — Michael J Metzger
(74) *Attorney, Agent, or Firm* — NIXON & VANDERHYE P.C.

(57) ABSTRACT

A data processing apparatus includes control flow prediction circuitry that generates a control flow prediction in respect of a group of one or more instructions. Storage circuitry used by the control flow prediction circuitry stores data in association with groups of instructions used to generate the control flow prediction for each of the groups of instructions. Control flow prediction update circuitry inserts new data into the storage circuitry in association with a new group of one or more instructions in dependence on one or more conditions being met when a miss occurs for the group of one or more instructions in the storage circuitry.

13 Claims, 5 Drawing Sheets

SELECTIVE CONTROL FLOW PREDICTOR INSERTION

TECHNICAL FIELD

The present disclosure relates to data processing and particularly control flow prediction.

DESCRIPTION

Control flow prediction circuitry can be used to predict the existence of a control flow instruction within a block of instructions and/or its direction. However, such circuitry works by storing data regarding blocks of instructions as they are encountered. Only a limited amount of storage space can be made available and once this storage space runs out, it becomes necessary to delete data that is used for making such predictions. This is not only wasteful of previous resource usage, but can necessitate analysis being re-performed in the future if the block of instructions is encountered again.

SUMMARY

Viewed from a first example configuration, there is provided a data processing apparatus comprising: control flow prediction circuitry configured to generate a control flow prediction in respect of a group of one or more instructions, wherein the control flow prediction circuitry comprises storage circuitry configured to store data in association with groups of instructions used to generate the control flow prediction for each of the groups of instructions; and control flow prediction update circuitry configured to insert new data into the storage circuitry in association with a new group of one or more instructions in dependence on one or more conditions being met when a miss occurs for the group of one or more instructions in the storage circuitry.

Viewed from a second example configuration, there is provided a data processing method comprising: generating a control flow prediction in respect of a group of one or more instructions, wherein the control flow prediction circuitry comprises storage circuitry configured to store data in association with groups of instructions used to generate the control flow prediction for each of the groups of instructions; and inserting new data into the storage circuitry in association with a new group of one or more instructions in dependence on one or more conditions being met when a miss occurs for the group of one or more instructions in the storage circuitry.

Viewed from a third example configuration, there is provided A non-transitory computer-readable medium to store computer-readable code for fabrication of a data processing apparatus comprising: control flow prediction circuitry configured to generate a control flow prediction in respect of a group of one or more instructions, wherein the control flow prediction circuitry comprises storage circuitry configured to store data in association with groups of instructions used to generate the control flow prediction for each of the groups of instructions; and control flow prediction update circuitry configured to insert new data into the storage circuitry in association with a new group of one or more instructions in dependence on one or more conditions being met when a miss occurs for the group of one or more instructions in the storage circuitry.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: control flow prediction circuitry configured to generate a control flow prediction in respect of a group of one or more instructions, wherein the control flow prediction circuitry comprises storage circuitry configured to store data in association with groups of instructions used to generate the control flow prediction for each of the groups of instructions; and control flow prediction update circuitry configured to insert new data into the storage circuitry in association with a new group of one or more instructions in dependence on one or more conditions being met when a miss occurs for the group of one or more instructions in the storage circuitry.

In these examples, when a miss occurs on the control flow prediction circuitry for a given group of instructions, new data (i.e. a new entry) might not be added to the storage circuitry used by the control flow prediction circuitry to make a prediction for the group of one or more instructions. Instead, the new data is added specifically when one or more conditions are met. In this way, it is possible to limit the addition of new data to the storage circuitry to situations where the new data is likely to be useful in the future. In particular, if it can be determined that the new data is unlikely to be reused then the storage of such data can be blocked. This in turn inhibits useful data that will be reused from being evicted from the storage circuitry to make way for data that will not be reused. The groups of one or more instructions could correspond with blocks of instructions that are fetched for which control flow predictions are made. Control flow instructions can include branch instructions as well as return instructions where a value of a return address is stored on a stack (for instance) or in a return address register. The data is data that is used to perform the prediction. This might include historical data regarding the block of instructions and/or other architectural states that can be used to make a prediction in relation to the group of instructions.

In some examples, the control flow prediction comprises a prediction of whether the group of one or more instructions contains a control flow instruction. That is, the control flow prediction circuitry is able to predict or estimate whether the block of instructions includes an instruction that is a control flow instruction. This can be achieved without the need to fully decode each of the instructions within the block of instructions. In these situations, the data stored for a group of instructions might simply be a bit to indicate whether a control flow instruction was previously spotted within the group of instructions (e.g. when each of the instructions is finally decoded or partially decoded) or could be a set of bits to indicate the type of control flow instruction previously spotted within the group of instructions. The control flow prediction circuitry could therefore take the form of one or more Branch Target Buffers (BTBs).

In some examples, the group of one or more instructions contains a control flow instruction; and one of the conditions is a taken condition, which is met when the control flow instruction is predicted to be taken. It could be assumed that the default prediction of a control flow prediction circuit is that no branch will be taken within a block of instructions. By making such an assumption, it is possible for the fetch pipeline to simply fetch blocks of instructions in program order (rather than execution order) since not taking a control flow instruction in one block will simply result in the next sequential block from being fetched. In addition, software often contains a number of branches that are taken with low probability—e.g. branches that are used for debugging or that are used for unlikely error conditions arising such that, statistically, branches are less likely to be taken. For these reasons it is also less useful to store data relating to not taken branches. Consequently, when a branch instruction is encountered that is not taken, it may (in these examples) not result in data being added to the storage circuitry.

In some examples, the data processing apparatus comprises: control flow direction prediction circuitry configured to predict whether the control flow instruction will be taken. Control flow direction prediction circuitry is used to determine whether a conditional control flow instruction (one that might or might not be taken based on some predicate) will in fact be taken. There are a number of such types of control flow instruction, such as a bimodal predictor or a global-history based predictor.

In some examples, the group of one or more instructions contains a control flow instruction; and one of the conditions comprises a cache hit condition, which is met when at least one of the control flow instruction and an address of the control flow instruction hit in at least one cache. For instance, in some examples, the condition might be that there is a hit in both caches. Where a hit occurs with respect to the control flow instruction itself, it means that the control flow instruction has either been seen recently or that its execution was predicted—which suggests that it was possible to tell that the instruction was going to be encountered. If a hit occurs with respect to an address of the control flow instruction (e.g. an address at which the control flow instruction is located) then this suggests that the address of the instruction has been accessed recently. Both of these situations suggest that an instruction has been encountered recently and thus suggest that the instruction will be encountered multiple times. In this case, storing data relating to the prediction for the group (block) of instructions is worthwhile.

In some examples, the at least one cache comprises an instruction cache and an address translation cache; and the cache hit condition is met when the control flow instruction hits in the instruction cache and the address of the control flow instruction hits in the address translation cache. An example of an address translation cache would be a translation lookaside buffer, which is used to cache translations between virtual addresses and physical addresses.

In some examples, one of the conditions comprises a heuristic condition in which an allocation predictor is consulted, which is met when a probability of the control flow instruction being re-encountered is above a threshold. Heuristics can be used to determine, probabilistically, whether a particular requirement will be met or not. Here, the heuristic in question can be turned to the question of whether a particular control flow instruction in the group of one or more instructions is likely to be encountered again (in which case, it is worth storing information relating to that control flow instruction so that a future prediction can be made) or whether it is less likely to be encountered again (in which case it may not be worth storing the data in order to avoid eviction from the storage circuitry). Note that it may be the case that the threshold in question is not precisely known. The threshold may simply represent some (unknown) likelihood that the control flow instruction is going to be re-encountered.

In some examples, the allocation predictor uses a set-dueling heuristic. Set dueling is a technique used to determine, probabilistically, which of several actions should be taken. In these examples, a random set of inputs is always acted on in one particular way and the performance of that action is measured. A second random set of inputs is always acted on in another way and the performance of that action is measured. The remaining (typically much larger) set of inputs is acted on according to which of the first action or second action is performing better. The sets of inputs that are always acted upon are referred to as leader sets. The set that follows the better performing leader set is known as the follower set. In some examples, the performance is measured across the entirety of the control flow prediction circuitry. In other examples, the performance is measured across only one part of the control flow prediction circuitry. For instance, where the control flow prediction circuitry is hierarchical, only a final level of the control flow prediction circuitry is considered since, being larger, it is more likely that a previously encountered control flow instruction will be discovered to have been previously encountered.

In some examples, the set-dueling heuristic condition is considered after the cache hit condition has been determined to not be met. The cache hit condition can be considered to be such a strong indicator that a control flow instruction will be re-encountered that it is considered in preference to the heuristic condition.

In some examples, leader sets of the set-dueling heuristic condition are changed after a predetermined period of time. By changing the leader sets (e.g. which inputs are always acted upon), it is possible to get a better representation of control flow instructions. For instance, without changing the leader set, it could simply be the case that every control flow instruction that is re-encountered happens to be in the leader sets. In these situations, the performance indicators will suggest that data should be kept for control flow instructions since they are likely to be re-encountered. If however, by coincidence, every other control flow instruction is never re-encountered then performance will actually be poor. By changing the leader set, this situation can be avoided.

In some examples, the predetermined period of time is a predetermined number of micro-architectural events. The period of time need not be measured by a clock but could instead be measured based on the occurrence of particular events. For instance, in some examples, this could be a number of cycles in which at least one predict block is transferred from the predict pipe to the fetch pipe—which therefore represents the speed at which predictions are being acted upon in the system.

In some examples, positions of leader sets of the set-dueling heuristic condition are staggered across each set group. That is, the leader sets are not all clustered together, nor do they occur at regular predictable intervals—both of which could lead to a coincidental situation in which the selection of the leader sets inherently points to one particular action as preferable to others.

In some examples, the set-dueling heuristic condition is calculated among control flow instructions that are predicted to be taken. As previously explained, control flow instructions that are predicted to not be taken can be seen as being of little relevance since 'not taken' may be considered to be the default output for a control flow predictor. Where it is undesirable to store such predictions, it is therefore undesirable to also train a heuristic on control flow instructions that lead to those predictions.

Particular embodiments will now be described with reference to the figures.

Figure 1:
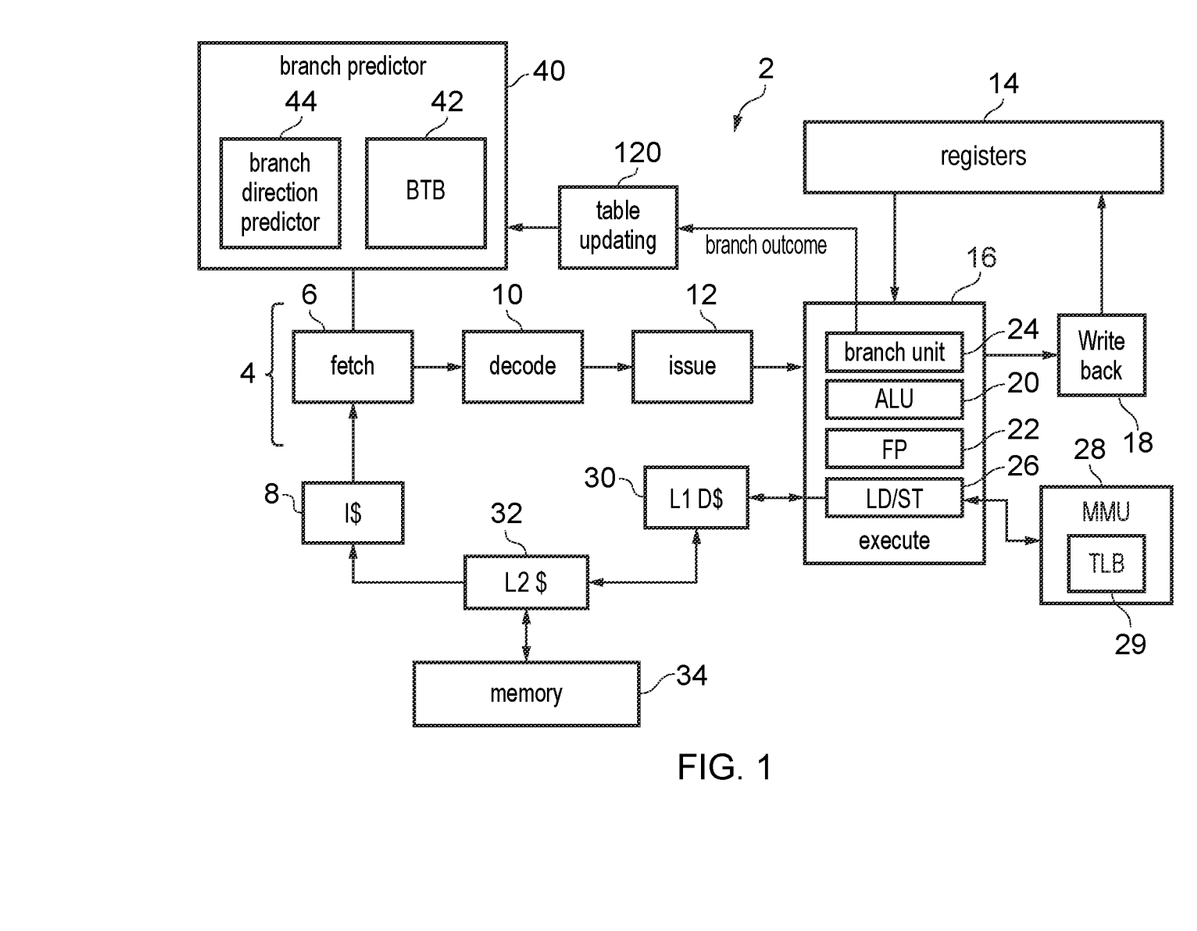
FIG. 1 schematically illustrates an example of a data processing apparatus.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 28 for performing load/store operations to access data in a memory system 8, 30, 32, 34. A memory management unit (MMU) 28 is provided for performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and may also specify access permissions which govern whether a given process executing on the pipeline is allowed to read, write or execute instructions from a given memory region. The access permissions specified in the page tables accessed by the MMU 28 may be relatively coarse-grained in that they may specify permissions for a particular memory region which apply to an entire software process as a whole, so that it is not efficient to use the page tables to provide different levels of access permissions for different sub-portions of instructions within a software process.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the apparatus 2 includes a branch predictor 40 for predicting outcomes of branch instructions. The branch predictor is looked up based on addresses of instructions (or blocks of instructions) provided by the fetch stage 6 and provides a prediction on whether those instructions are predicted to include branch instructions, and for any predicted branch instructions, a prediction of their branch properties such as a branch type, branch target address and branch direction (predicted branch outcome, indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios.

Figure 2:
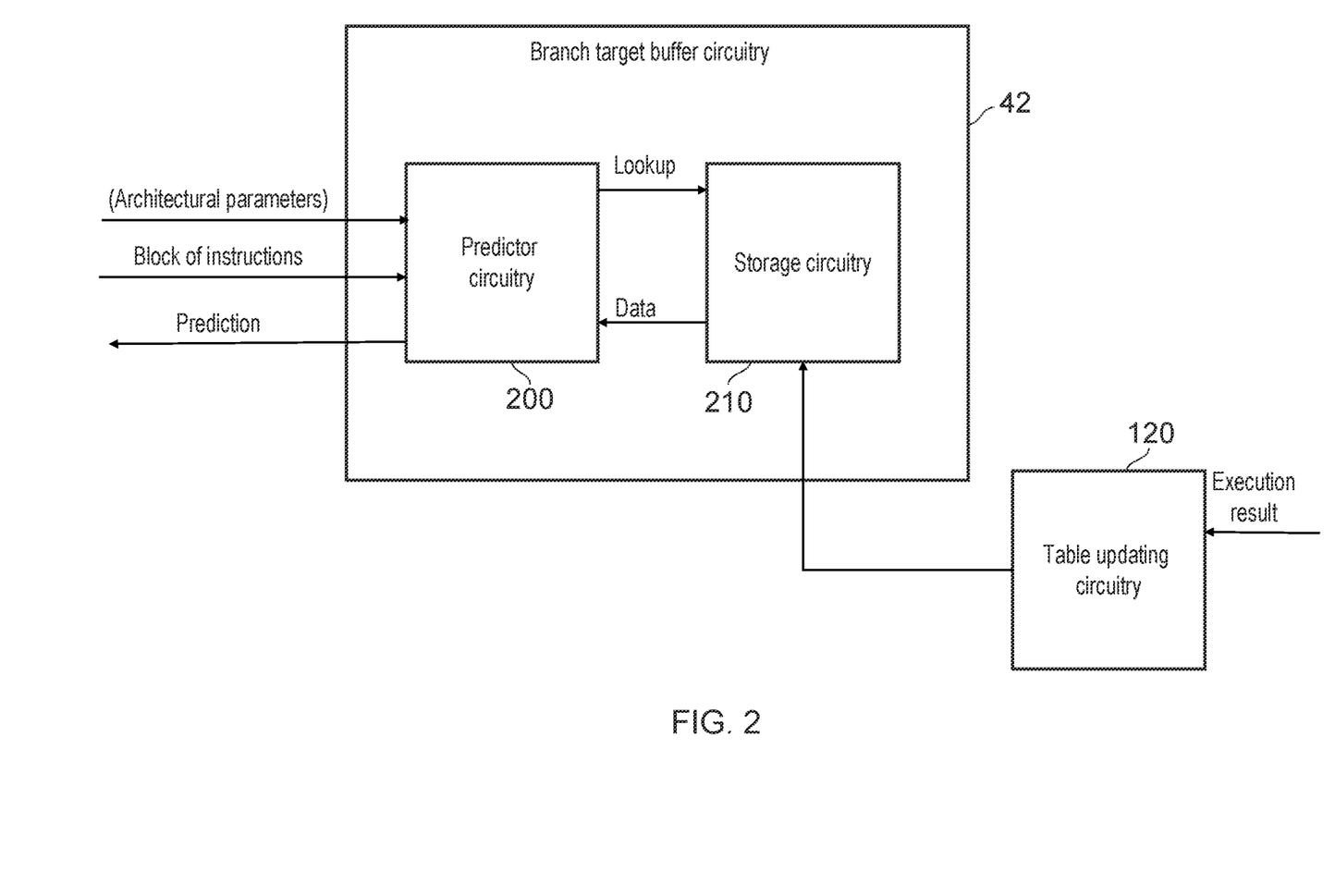
FIG. 2 shows the branch prediction loop in more detail.

FIG. 2 shows the branch prediction loop in more detail. Here, the Branch Target Buffer (BTB) circuitry 42 (which is an example of the claimed control flow prediction circuitry) includes storage circuitry 210 and predictor circuitry 200. The storage circuitry contains that is used by the predictor for making predictions. Each item of data can be associated with a different block of instructions. This data might take the form of historical data, for instance, that indicates whether a previous block of instructions contained a branch (which is an example of a control flow instruction) in a previous execution and potentially where in the group of instructions that branch was located and where the branch was taken to. Other architectural state might also be stored. For instance, the value of a global history register or other registers might be stored in combination with the nature of branch instructions within the group/block. When the group/block of instructions is encountered again, the storage circuitry can be queried for the relevant associated data and this data can then be used by the predictor to indicate what the prediction is. This could take place by considering what happened in the past when the current architectural parameters were present and considering the most common outcome. Another technique would simply be to make a prediction that corresponds with the most recent outcome of the same branch of instructions.

The table updating circuitry 120 (which is an example of the claimed control flow prediction update circuitry) is used to take an execution result from a control flow instruction and store the relevant data to the storage circuitry 210 either in the form of an insertion (where no entry previously existed with which to make a prediction) or an update (where such data did exist).

In practice, the storage circuitry 210 is of limited size and this is generally insufficient to store data on every block/group of instructions that will be encountered. Furthermore, as the size of the storage circuitry 210 grows, either the length of time required to query it will increase, or the complexity/size/power consumption of the storage circuitry will increase to keep the querying process past (e.g. by allowing parallel queries to take place). Consequently, at a certain point, the storage circuitry will fill. Further entries that are to be stored to the storage circuitry 210 thereby result in the eviction of a victim entry. In other words, the prediction data for that entry is lost. The inventors of the present technique have discovered a technique for restricting evictions to data that is likely to be less useful. In particular, the insertions performed by the table updating circuitry 120 is limited to situations where the branch instruction within a group/block of instructions is likely to be encountered again. This way, useful data in the storage circuitry 210 is not evicted to make way for data that might only be used once (and therefore whose use within the storage circuitry 210 is limited).

Figure 3:
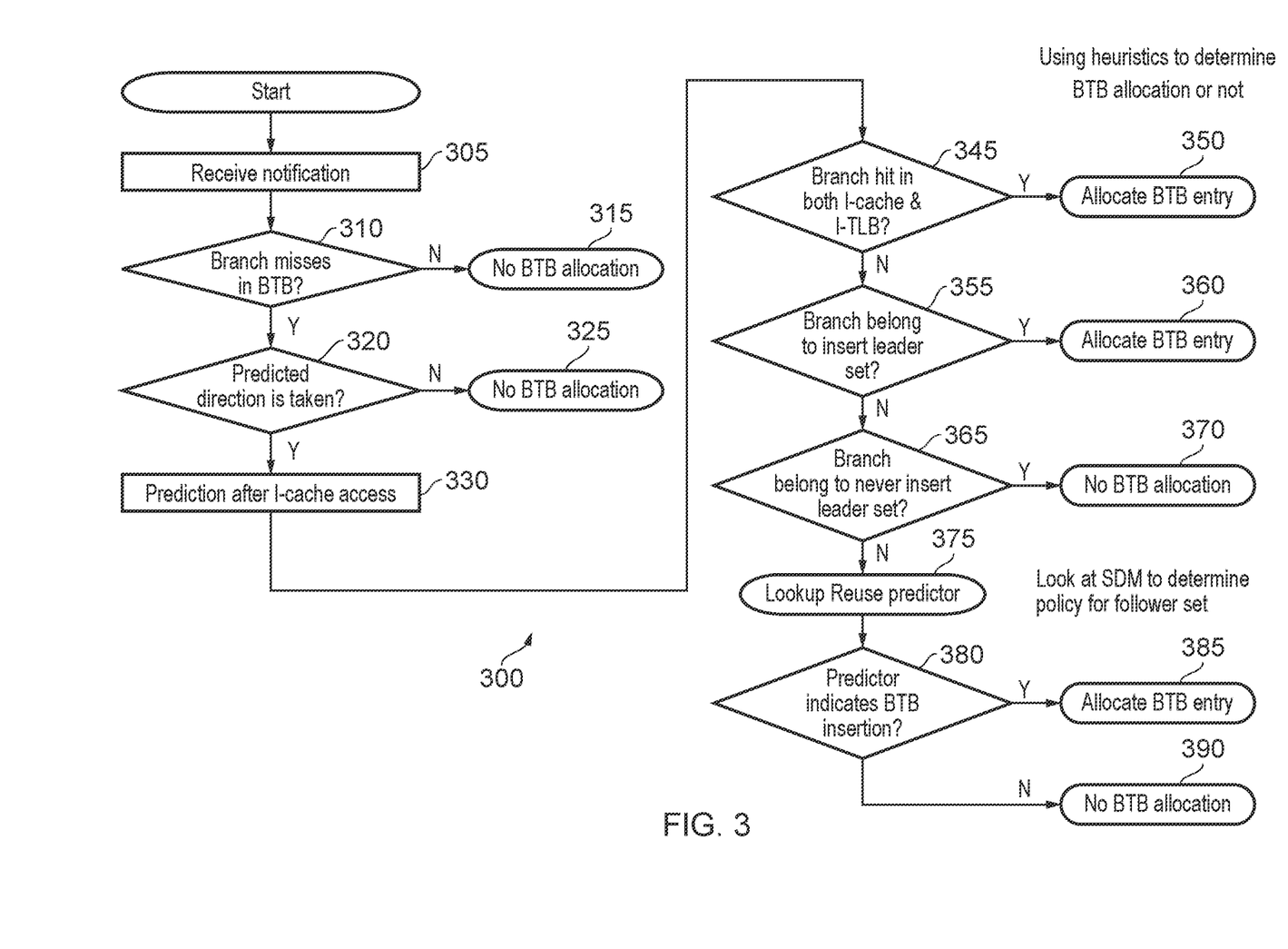
FIG. 3 illustrates a flowchart in accordance with some embodiments.

FIG. 3 illustrates a flowchart 300 in accordance with some embodiments. The flowchart shows the decision making process that may be made by the table updating circuitry 120 in order to decide whether a new entry should be inserted into the storage circuitry 210. It will be appreciated that the flowchart 300 shows an entire mechanism, and it is not necessary for every test within the flowchart to always be performed.

At step 305, notification of the next instruction is received. Here, it is assumed that the next instruction happens to be a branch instruction. At step 310, it is determined whether the branch misses in the BTB 42. If not (e.g. if there is a hit) then an entry for the branch instruction (or the block of instructions containing the branch instruction) already exists and so at step 315 no allocation needs to take place. That isn't to say that the entry for the branch instruction won't be updated, but simply that there is no need for a new entry to be created.

If there is a miss in the BTB then at step 320 it is determined whether the prediction for this branch instruction is for the instruction to be taken. If not, (e.g. if the prediction is that the branch will not be taken) then no allocation to the BTB 42 occurs at step 325. The reason to not allocate entries to the BTB 42 for not taken branches is that not taken can be considered to be a default behaviour of any branch instruction. Hence, if the prediction is that the branch will not be taken then there is no need to store any data in the BTB 42 for that branch/block.

If the prediction is that the branch will be taken, then at step 330 the instruction cache 8 is accessed to see whether the instruction in question is already within the instruction cache 8 or whether it needs to be fetched. Part of this process involves converting the program counter value for the branch instruction from virtual form to physical form. This can involve carrying out a page walk process. However, if the page walk has been performed recently then the translation can be found within the Translation Lookaside Buffer (TLB) 29. At step 345, it is determined whether the instruction was already in the instruction cache 8 and also whether the address for the branch instruction was already stored within the TLB 29. If both conditions are met then at step 350 an entry is allocated to the BTB 42. This is because if the instruction is in the instruction cache 8 then it is likely that the instruction has (possibly recently) been accessed. Furthermore, if the address of the instruction is within the TLB then the address of the branch instruction has recently been accessed. Both situations suggest that the branch instruction has recently been accessed and therefore there is a realistic prospect that the instruction is being reaccessed. In that case, it may be reasonable to assume that the instruction will be accessed again soon and therefore it is worth storing data relating to the branch instruction and/or its associated block in the storage circuitry 210.

If these requirements are not met then a heuristic process is applied to see whether the current performance of the system favours storing the prediction data or not. The present technique suggests the use of set-dueling to make this determination.

At a step 355 it is determined whether the instruction belongs to the insert leader set. This is the set of branch instructions for which the prediction data is always inserted in to the storage circuitry 210. Consequently, if the branch instruction does belong to this leader set then at step 360, an entry is allocated in the storage circuitry for the branch instruction/its associated block of instructions.

Otherwise, at a step 365, it is determined whether the instruction belongs to the never insert leader set. This is the set of branch instructions for which the prediction data is never inserted into the storage circuitry 210. Consequently, if the branch instruction does belong to this leader set then at step 370, an entry is not allocated in the storage circuitry for the branch instruction/its associated block of instructions.

Otherwise, at step 375, the reuse predictor is consulted. That is, it is determined which of the two leader sets is currently performing better. That is, it is determined from the leader sets whether it is better to insert data into the storage circuitry 210 or whether it is better to not do so—e.g. which option results in the best performance.

Then at step 380 it is determined whether it is better to allocate/insert rom the reuse predictor. If so then at step 385, an entry is allocated at step 385. Otherwise (if the performance appears to be better for the leader sets that do not allocate) then allocation does not occur at step 390.

The performance of the leader sets may be reset at particular intervals in order to determine which option has better performance at a given moment in time. This might be measured as a period of time (e.g. via a clock) or via the occurrence of a number of events (e.g. a number of instructions executed). Consequently, as the nature of the program being executed changes, it is possible to perform the action that is most likely to result in good performance.

There are a number of ways in which control flow instructions can be assigned to the different sets. One way of doing this is by carrying out a hash on the program counter value of the control flow instruction (e.g. consider the least significant bits of the program counter value) and using this result to assign the instruction to one of the sets. For instance, if there are 256 sets, the first set and the last set might be leaders and control flow instructions might be assigned to a set based on the least significant 8 bits of the program counter value. In another example (again having 256 sets with each cache line being 64 bytes in length) one might use bits [13:6] of the program counter value to decide which of the 256 sets a branch instruction belong. The set-group ID bits (e.g. which of the set groups a branch belongs to) may be decided using the bits above [13].

Figure 4:
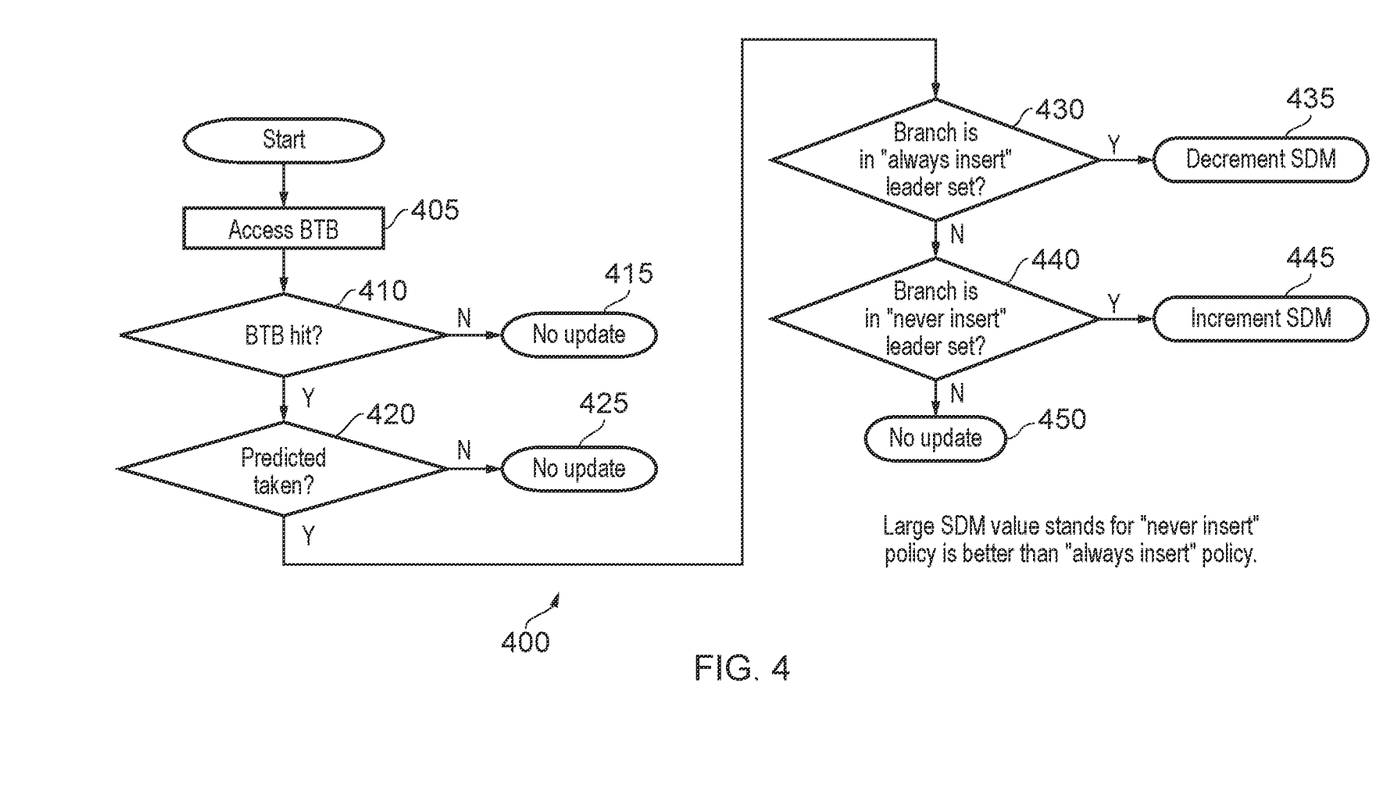
FIG. 4 illustrates, in the form of a flowchart, a process for updating the reuse predictor.

FIG. 4 illustrates, in the form of a flowchart 400, a process for updating the reuse predictor. The update process occurs in response to the control flow prediction circuitry (e.g. BTB) 42 being accessed at step 405.

At a step 415 it is determined whether there was a hit in the BTB 42. If not, then no update occurs at step 415 because there is no reuse taking place.

Assuming there was a hit then at step 420, it is determined whether the branch is predicted taken or not. If not, then at step 425 no update occurs. As with FIG. 3, no update occurs because there is seen to be little value in updating an entry of the BTB that relates to a not taken branch.

At step 435 it is then determined whether the branch instruction in question forms part of the "always insert" leader set. If so, then at step 435 the value of the set-dueling monitor counter is decremented.

Alternatively, at step 440, it is determined whether the branch instruction forms part of the "never insert" leader set. If so, then at step 445 the value of the set-dueling monitoring counter is incremented. Note that an entry could be part of the "never insert" leader set (despite having hit in the BTB at step 410) if the branch hit in the instruction cache and TLB (i.e. steps 345/350 in FIG. 3).

Finally, at step 450, if the branch instruction is part of neither leader set, then no update occurs at step 450.

In this system, a large value of the set-dueling monitoring counter means that the never insert policy is performing better than the always insert policy. Consequently, branch instructions that belong to the follower sets would be inclined to not have new entries inserted into the BTB 42. Of course, instructions that hit in the instruction cache and the TLB are, in these examples, always inserted into the BTB. Therefore, the follower set branch instructions have to miss in the instruction cache or the TLB in order to not be inserted into the TLB.

Note that the training of the counter occurs regardless of whether the control flow instruction hits in the instruction cache 18 or whether its address hits in the TLB 29. The counter may saturate. That is to say that, for instance, for a 7-bit counter once the counter reaches 0, further decrementation has no effect. Similarly, once the counter reaches 127, further incrementation has no effect.

Figure 5:
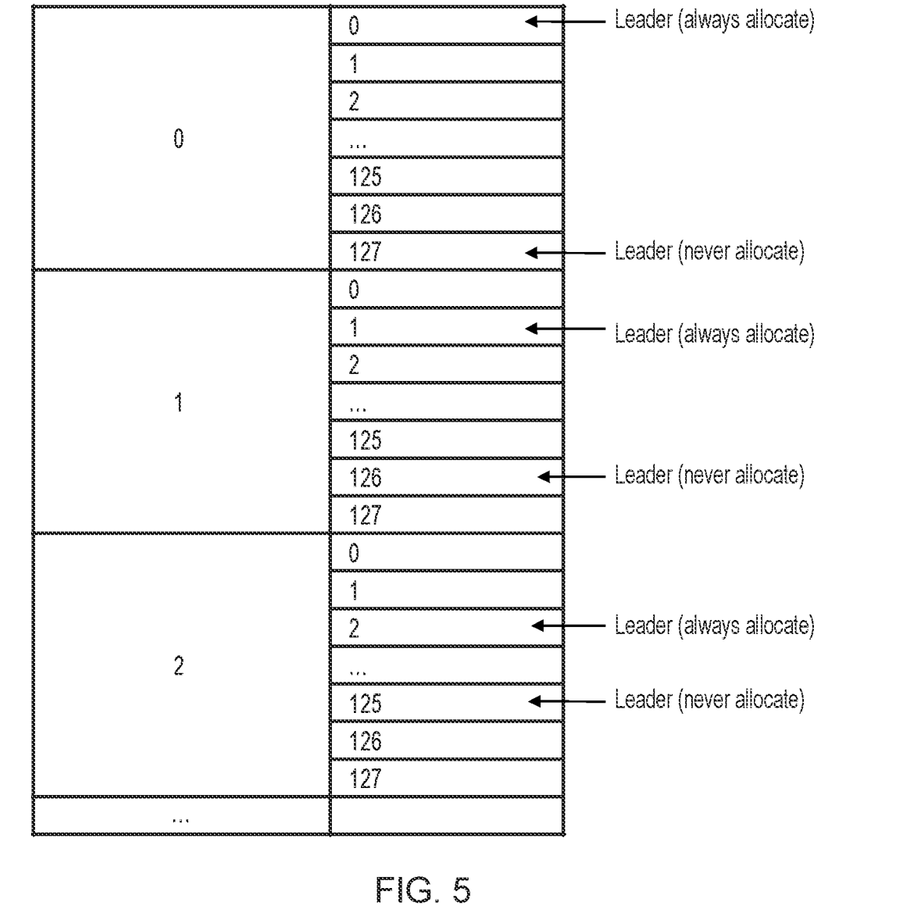
FIG. 5 illustrates an example setup of the leader sets and follower sets.

FIG. 5 illustrates an example setup of the leader sets and follower sets. In this example, there are eight set groups, with each set group containing 128 entries (for a total of 1024 entries). The two leader sets are distributed among the eight set groups. In this example, each set group contains exactly one of each of the two leader sets. Those entries that are not leader sets are follower sets and follow whichever of the leader sets is best performing (as indicated by the SDM counter).

In this example, the leader set entries are staggered. In particular, across the groups, the always allocate leader set entries are forward staggered by one entry and the never allocate leader set entries are backward staggered by one entry. So in the first set group, the always allocate leader set entry and the never allocate leader set entry are the first and last entries respectively. In the second set group, the always allocate leader set entry and the never allocate leader set entry are the second and second last entries respectively and so on. Then, every 262144 processor cycles (e.g. as can be reflected by an 18 bit binary counter) in which at least one predict block of instructions containing one or more instructions is predicted and passed to the fetch pipeline, the offset of the leader group entries is incremented by 1 (wrapping around). So after 262144 such processor cycles, entry 1 in the first set group will be the leader set entry for always allocate and entry 0 in the first set group will be the leader set entry for never allocate. These numbers are of course merely an example.

As previously explained, a branch instruction belongs to one of these sets by considering, for instance, insignificant bits of the program counter value of that branch instruction (e.g. bits [13:6] to determine the set and bits [16:14] to determine the set group). This then indicates the set group and entry in that set group into which the branch instruction belongs.

Other allocations are of course possible. However, a feature of the above allocation system is that by rotating which entries are used as the leader sets, it is possible to limit the effect of any coincidences that might arise as a consequence of certain branch instructions always being reused. For instance, this helps to limit the effect of (by coincidence) every branch instruction that falls into entry 0 of group 0 happening to be reused where other instructions are never reused. Since the leader rotates, the weight applied to this situation is kept small.

The above techniques make it possible to improve the average number of instructions processed per cycle by maintaining data that is most likely to be useful for performing future branch prediction. Programs with very large instruction cache, TLB, and branch target buffer working sets are important for modern processors and this technique provided approximately a 9% performance uplift in some performance benchmark testing applications.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The application could be configured in accordance with the following clauses:

1. A data processing apparatus comprising:
   control flow prediction circuitry configured to generate a control flow prediction in respect of a group of one or more instructions, wherein the control flow prediction circuitry comprises storage circuitry configured to store data in association with groups of instructions used to generate the control flow prediction for each of the groups of instructions; and
   control flow prediction update circuitry configured to insert new data into the storage circuitry in association with a new group of one or more instructions in dependence on one or more conditions being met when a miss occurs for the group of one or more instructions in the storage circuitry.
2. The data processing apparatus according to any preceding clause, wherein
   the control flow prediction comprises a prediction of whether the group of one or more instructions contains a control flow instruction.
3. The data processing apparatus according to any preceding clause, wherein
   the group of one or more instructions contains a control flow instruction; and
   one of the conditions is a taken condition, which is met when the control flow instruction is predicted to be taken.
4. The data processing apparatus according to clause 3, comprising:
   control flow direction prediction circuitry configured to predict whether the control flow instruction will be taken.
5. The data processing apparatus according to any preceding clause, wherein
   the group of one or more instructions contains a control flow instruction; and
   one of the conditions comprises a cache hit condition, which is met when at least one of the control flow instruction and an address of the control flow instruction hit in at least one cache.
6. The data processing apparatus according to clause 5, wherein
   the at least one cache comprises an instruction cache and an address translation cache; and
   the cache hit condition is met when the control flow instruction hits in the instruction cache and the address of the control flow instruction hits in the address translation cache.
7. The data processing apparatus according to any one of clauses 5-6, wherein
   one of the conditions comprises a heuristic condition in which an allocation predictor is consulted, which is met when a probability of the control flow instruction being re-encountered is above a threshold.
8. The data processing apparatus according to clause 7, wherein
   the allocation predictor uses a set-dueling heuristic.
9. The data processing apparatus according to any one of clauses 7-8, wherein
   the set-dueling heuristic condition is considered after the cache hit condition has been determined to not be met.
10. The data processing apparatus according to any one of clauses 7-9, wherein
    leader sets of the set-dueling heuristic condition are changed after a predetermined period of time.
11. The data processing apparatus according to clause 10, wherein
    the predetermined period of time is a predetermined number of micro-architectural events.
12. The data processing apparatus according to any one of clauses 7-11, wherein
    positions of leader sets of the set-dueling heuristic condition are staggered across each set group.
13. The data processing apparatus according to clause 7-12, wherein
    the set-dueling heuristic condition is calculated among control flow instructions that are predicted to be taken.
14. A data processing method comprising:
    generating a control flow prediction in respect of a group of one or more instructions, wherein the control flow prediction circuitry comprises storage circuitry configured to store data in association with groups of instructions used to generate the control flow prediction for each of the groups of instructions; and
    inserting new data into the storage circuitry in association with a new group of one or more instructions in dependence on one or more conditions being met when a miss occurs for the group of one or more instructions in the storage circuitry.

15. A non-transitory computer-readable medium to store computer-readable code for fabrication of a data processing apparatus comprising:
control flow prediction circuitry configured to generate a control flow prediction in respect of a group of one or more instructions, wherein the control flow prediction circuitry comprises storage circuitry configured to store data in association with groups of instructions used to generate the control flow prediction for each of the groups of instructions; and
control flow prediction update circuitry configured to insert new data into the storage circuitry in association with a new group of one or more instructions in dependence on one or more conditions being met when a miss occurs for the group of one or more instructions in the storage circuitry.

We claim:
1. A data processing apparatus comprising:
control flow prediction circuitry configured to generate a control flow prediction in respect of a group of one or more instructions, wherein the control flow prediction circuitry comprises storage circuitry configured to store data in association with groups of instructions used to generate the control flow prediction for each of the groups of instructions; and
control flow prediction update circuitry configured to:
insert new data into the storage circuitry in association with a new group of one or more instructions in dependence on one or more conditions being met when a miss occurs for the group of one or more instructions in the storage circuitry,
wherein
the group of one or more instructions contains a control flow instruction;
one of the conditions comprises a cache hit condition, which is met when at least one of the control flow instruction and an address of the control flow instruction hit in at least one cache; and
one of the conditions comprises a heuristic condition in which an allocation predictor is consulted, which is met when a probability of the control flow instruction being re-encountered is above a threshold.

2. The data processing apparatus according to claim 1, wherein
the control flow prediction comprises a prediction of whether the group of one or more instructions contains a control flow instruction.

3. The data processing apparatus according to claim 1, wherein
the group of one or more instructions contains a control flow instruction; and
one of the conditions is a taken condition, which is met when the control flow instruction is predicted to be taken.

4. The data processing apparatus according to claim 3, comprising:
control flow direction prediction circuitry configured to predict whether the control flow instruction will be taken.

5. The data processing apparatus according to claim 1, wherein
the at least one cache comprises an instruction cache and an address translation cache; and
the cache hit condition is met when the control flow instruction hits in the instruction cache and the address of the control flow instruction hits in the address translation cache.

6. The data processing apparatus according to claim 1, wherein
the allocation predictor uses a set-dueling heuristic.

7. The data processing apparatus according to claim 1, wherein
the set-dueling heuristic condition is considered after the cache hit condition has been determined to not be met.

8. The data processing apparatus according to claim 1, wherein
leader sets of the set-dueling heuristic condition are changed after a predetermined period of time.

9. The data processing apparatus according to claim 8, wherein
the predetermined period of time is a predetermined number of micro-architectural events.

10. The data processing apparatus according to claim 1, wherein
positions of leader sets of the set-dueling heuristic condition are staggered across each set group.

11. The data processing apparatus according to claim 1, wherein the set-dueling heuristic condition is calculated among control flow instructions that are predicted to be taken.

12. A data processing method comprising:
generating a control flow prediction in respect of a group of one or more instructions, wherein the control flow prediction circuitry comprises storage circuitry configured to store data in association with groups of instructions used to generate the control flow prediction for each of the groups of instructions; and
inserting new data into the storage circuitry in association with a new group of one or more instructions in dependence on one or more conditions being met when a miss occurs for the group of one or more instructions in the storage circuitry,
wherein
the group of one or more instructions contains a control flow instruction;
one of the conditions comprises a cache hit condition, which is met when at least one of the control flow instruction and an address of the control flow instruction hit in at least one cache; and
one of the conditions comprises a heuristic condition in which an allocation predictor is consulted, which is met when a probability of the control flow instruction being re-encountered is above a threshold.

13. A non-transitory computer-readable medium to store computer-readable code for fabrication of a data processing apparatus comprising:
control flow prediction circuitry configured to generate a control flow prediction in respect of a group of one or more instructions, wherein the control flow prediction circuitry comprises storage circuitry configured to store data in association with groups of instructions used to generate the control flow prediction for each of the groups of instructions; and
control flow prediction update circuitry configured to:
insert new data into the storage circuitry in association with a new group of one or more instructions in dependence on one or more conditions being met when a miss occurs for the group of one or more instructions in the storage circuitry,
wherein the group of one or more instructions contains a control flow instruction;

one of the conditions comprises a cache hit condition, which is met when at least one of the control flow instruction and an address of the control flow instruction hit in at least one cache; and one of the conditions comprises a heuristic condition in which an allocation predictor is consulted, which is met when a probability of the control flow instruction being re-encountered is above a threshold.

* * * * *